Figure 1:
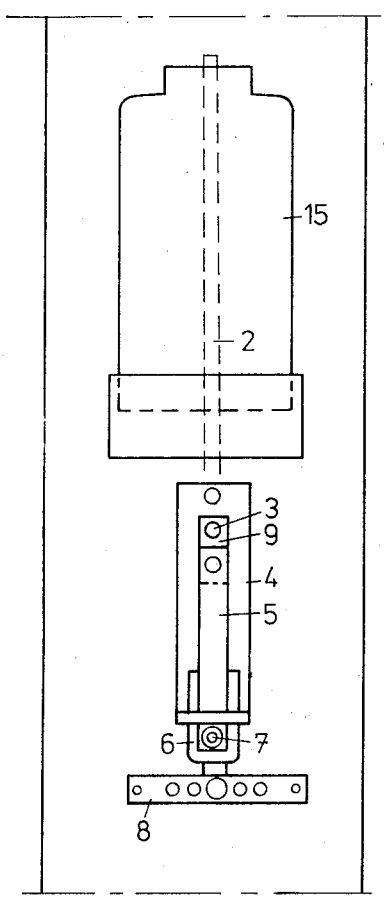

United States Patent
Kause

[15] 3,682,391
[45] Aug. 8, 1972

[54] FEEDING DEVICE FOR FODDER PRESERVING LIQUID
[72] Inventor: Niilo Kause, Paatinen, Finland
[22] Filed: Oct. 14, 1970
[21] Appl. No.: 80,657

[52] U.S. Cl. ............... 239/410, 137/98, 137/111, 239/561
[51] Int. Cl. ........................ B05b 1/14, B05b 7/12
[58] Field of Search ...... 239/561, 410, 412, 569, 586, 239/576; 302/20, 42; 137/98, 111, 114

[56] References Cited

UNITED STATES PATENTS

| | | | |
|---|---|---|---|
| 3,099,283 | 7/1963 | Holdeman et al. | 137/111 |
| 1,485,495 | 3/1924 | Eldred et al. | 239/561 |
| 2,957,630 | 10/1960 | Lamb | 239/569 X |
| 241,447 | 5/1881 | Thorpe | 302/42 |
| 433,426 | 7/1890 | Tucker | 302/42 X |
| 1,347,392 | 7/1920 | Lyon | 302/20 |
| 1,792,590 | 2/1931 | Kirk | 302/20 |
| 2,754,155 | 7/1956 | Kempthorne et al. | 302/20 |
| 3,012,732 | 12/1961 | Kempthorne | 302/20 |

FOREIGN PATENTS OR APPLICATIONS

| | | | |
|---|---|---|---|
| 1,319,449 | 1/1963 | France | 239/586 |

Primary Examiner—M. Henson Wood, Jr.
Assistant Examiner—Edwin D. Grant
Attorney—Richards & Geier

[57] ABSTRACT

A device is used in the harvesting of green fodder for feeding a fodder preserving liquid. The device includes a vane-like sensing element located inside the cutting machine and turning in the approximate direction of the fodder flow depending upon the quantity of fodder which has been cut. The fodder preserving liquid flows into the machine from a container through a valve and a nozzle unit. The sensing element regulates the valve and thus regulates the quantity of preserving liquid supplied to the fodder.

2 Claims, 3 Drawing Figures

PATENTED AUG 8 1972  3,682,391

FEEDING DEVICE FOR FODDER PRESERVING LIQUID

The present invention concerns a device for adding preserving liquid to green fodder in connection with the cutting of the fodder.

A method is previously known in which the preserving liquid is fed either directly from the shipment container or from a special container connected with the harvesting device, into the green fodder harvesting and cutting machine. In one of the methods control of the feed of preserving fluid is by means of a regulating organ placed in front of the cutting apparatus. This organ exerts a regulating effect upon the preserving liquid by means of its position. The position of the regulatory organ is dependent on contact by the growing fodder plant. It has been found that the above-mentioned previously known regulating organ is easily damaged for a number of reasons, mainly as a result of its location. Moreover, it is comparatively complex of its design and therefore also expensive of its price.

The aim of the present invention is to eliminate the said drawbacks and to accomplish a feeding device which is simple of design and inexpensive, and which also does not easily suffer damage, and the invention is mainly characterized in that as organ acting upon the valve regulating the liquid feed operates a vane-like sensor organ mounted inside the cutting machine, which depending on the quantity of cut fodder turns more or less into the direction of the fodder flow and at the same time regulates the valve and thereby regulates the amount of preserving liquid flowing into the nozzle section. The valve element has been fitted in previously known manner into the piece of tubing leading from the liquid container to the nozzle.

Of the advantages gained by the aid of the invention there may be mentioned the placement of the regulating organ inside the machine, in the fodder flow, whereby it cannot be damaged by external influences. The regulating organ placed inside the machine also has the advantage that its operation is exclusively dependent on the true amount of green fodder that has already been cut.

The present invention also comprises a new device for adjusting the amount of preserving liquid to be proper of its magnitude. This is accomplished in that the nozzle unit has been furnished with a number, consistent with what is needed, of different sized nozzle apertures, to each of which separately the preserving liquid line can be selectively connected.

Figure 2:
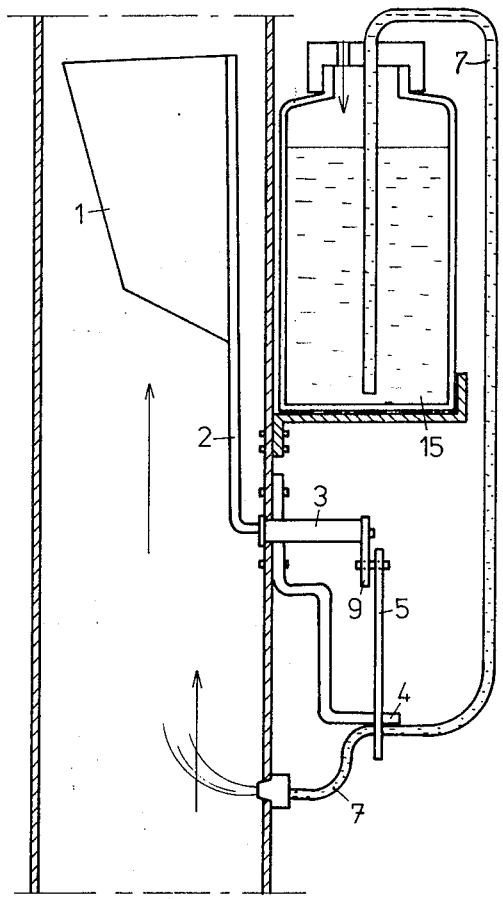
Figure 3:
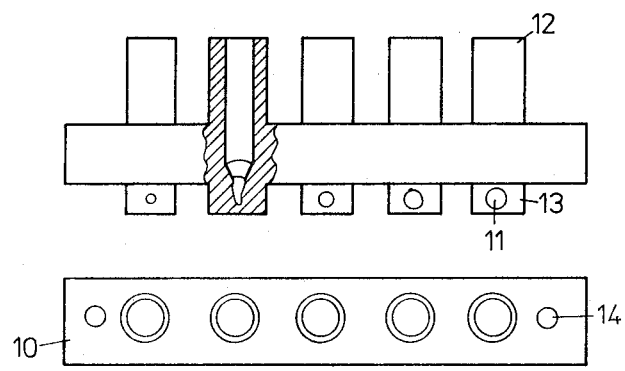

The invention is described in greater detail in the following with reference to the attached drawings, in which FIG. 1 represents the devices as seen from the front in the direction of travel of the harvesting machine, while FIG. 2 is a vertical section through the devices, seen from the side and with cutting in progress, and FIG. 3 shows the nozzle unit.

The drawing illustrates one embodiment of the invention, showing in vertical section the valve-regulating organ inside, in the flow of green fodder, the valve, and the set of nozzles. The vane-like sensing organ 1, which turns to approximate the direction of the fodder flow, is located inside the cutting machine and is attached to an arm 2, which passes through the wall of the machine, supported by tube 3. The lever 9 at the end of arm 2 raises or lowers the rod-like part 5, which at its lower end has an eye 6, through which passes the flexible tube 7. When there is no fodder flow, the vane 1 moves towards its horizontal position. This causes the part 5 to rise, and the eye 6 throttles the tube 7 by pressure against the body part 4, whereby the flow of preserving liquid from the container 15 into the nozzle unit 8 is prevented. Correspondingly, when the vane 1 is acted upon by fodder flow, it rises towards its vertical position depending on the quantity of fodder, and the part 5 descends. The tube 7 is then set free from compression by the eye 6 and preserving liquid can flow into the set of nozzles.

The nozzle unit consists of one body 10, in which the following parts may be distinguished: 11 is the nozzle aperture proper, through which the preserving liquid flows into the green fodder. This nozzle body has, for instance, five nozzle apertures of different sizes, of which any one can be selected to be used. The nozzle body 10 is mounted at a suitable point on the wall of the green fodder duct so that its projections 13 are within the green fodder duct in the green fodder flow. The preserving liquid tube is connected to the pipe-shaped projection 12 remaining on the outside, for instance by pushing the flexible tube upon this projection. The holes 14 are intended for fixing the nozzle body to the wall of the green fodder duct. The nozzle unit may be made e.g. of plastic by a casting process or by pressing in a die, whereby its manufacturing is inexpensive.

The invention is obviously not confined exclusively to the embodiment example described in the foregoing, but it may vary within the scope of the patent claims presented below.

I claim

1. A device for supplying a fodder preserving liquid during the harvesting of green fodder, comprising in combination with a casing through which the cut fodder flows, a sensing vane located within said casing and turning depending on the quantity of fodder that has been cut to substantially approximate the direction of the fodder flow, an arm carrying said vane and having an end extending through said casing, a liquid container attached to said casing, a nozzle unit fixed to said casing, of flexible tube connecting said liquid container with said nozzle unit, a rod-like part having an eye engaging said flexible tube and constituting a valve regulating the flow of liquid and a lever attached to said arm and pivotally connected with said rod-like part.

2. Feeding device according to claim 1, characterized in that the nozzle unit (10) comprises one, two or several nozzle apertures of different size for the purpose of regulating the liquid flow and selecting it to be appropriate as needed.

* * * * *